US009830216B2

(12) United States Patent
Nguyen

(10) Patent No.: US 9,830,216 B2
(45) Date of Patent: Nov. 28, 2017

(54) DEVICE MANAGEMENT SYSTEM AND METHOD FOR COMMISSIONING FIELD DEVICES WITH ERROR RESOLUTION

(71) Applicant: YOKOGAWA ELECTRIC CORPORATION, Musashino-shi, Tokyo (JP)

(72) Inventor: Huu Thien Tan Nguyen, Singapore (SG)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 384 days.

(21) Appl. No.: 14/566,139

(22) Filed: Dec. 10, 2014

(65) Prior Publication Data

US 2016/0170825 A1 Jun. 16, 2016

(51) Int. Cl.
G06F 11/00 (2006.01)
G06F 11/07 (2006.01)
G05B 19/042 (2006.01)

(52) U.S. Cl.
CPC ........ *G06F 11/0793* (2013.01); *G05B 19/042* (2013.01); *G06F 11/079* (2013.01); *G06F 11/0751* (2013.01); *G05B 2219/23068* (2013.01); *G05B 2219/24086* (2013.01); *G05B 2219/25068* (2013.01); *G05B 2219/31337* (2013.01); *G05B 2219/35494* (2013.01)

(58) Field of Classification Search
USPC .......................................................... 714/26
See application file for complete search history.

(56) References Cited

U.S. PATENT DOCUMENTS

| | | | | |
|---|---|---|---|---|
| 5,960,214 A | * | 9/1999 | Sharpe, Jr. | G05B 19/0423 700/9 |
| 6,094,600 A | * | 7/2000 | Sharpe, Jr. | G05B 19/0423 700/19 |
| 8,724,481 B2 | * | 5/2014 | Sasaki | G05B 19/4184 370/242 |

(Continued)

FOREIGN PATENT DOCUMENTS

DE  10 2012 019 599 A1  4/2014
JP        05-151484 A    6/1993
(Continued)

OTHER PUBLICATIONS

Extended European Search Report dated May 4, 2016, issued in counterpart European Patent Application No. 15 18 9583. (8 pages).

(Continued)

*Primary Examiner* — Amine Riad
(74) *Attorney, Agent, or Firm* — Westerman, Hattori, Daniels & Adrian, LLP

(57) ABSTRACT

A device management system for performing validation prior to commissioning at least one field device. The system includes a commissioning tool operable to receive at least one source file relating to the at least one field device for import operation, and a processor operable to check the source file for any error. If at least one error is found in the source file, the processor is operable to refer to an error resolution database for providing guidance on resolution of error associated with the source file without terminating the import operation.

20 Claims, 9 Drawing Sheets

(56) References Cited

U.S. PATENT DOCUMENTS

| | | | |
|---|---|---|---|
| 8,953,039 B2* | 2/2015 | Jia | G06K 9/6264 |
| | | | 348/139 |
| 9,568,897 B2* | 2/2017 | Geveci | G05B 13/04 |
| 2009/0276486 A1 | 11/2009 | Tandon et al. | |
| 2012/0253540 A1 | 10/2012 | Coyne et al. | |
| 2014/0032972 A1* | 1/2014 | Ramachandra | G05B 19/0425 |
| | | | 714/37 |
| 2014/0067091 A1 | 3/2014 | Vishwanath et al. | |

FOREIGN PATENT DOCUMENTS

| | | |
|---|---|---|
| JP | 2007-122697 A | 5/2007 |
| JP | 2007-124206 A | 5/2007 |
| JP | 2013-003652 | 1/2013 |

OTHER PUBLICATIONS

Office Action dated May 23, 2017, issued in counterpart Japanese Patent Application No. 2015-240953, with English translation. (11 pages).

* cited by examiner

Fig. 4A

Device list file

| No | Device Property | Mandatory? | Description | Data Type | Validation | Auto fix rule |
|---|---|---|---|---|---|---|
| 1 | System | Y | The system the device belongs to. | String | Value should only be: XXX system or YYY system | Dropdown list shows 2 items: XXX system or YYY system. Selected value may be YYY system. |
| 2 | Device tag | Y | The name of the device that is managed by the commissioning tool. | String | Max 32 Characters. Only contains character in ~ -!@#$%^&*()_+={}[]\|:;"'<>,.?/ a-z,A-Z,0-9 | Get value of Physical device tag as Device tag if Physical device tag value is valid, otherwise, device is considered as invalid device |
| 3 | Physical device tag | | The device tag information on the device. | String | Max 32 Characters. Only contains character in ~ -!@#$%^&*()_+={}[]\|:;"'<>,.?/ a-z,A-Z,0-9 | Get value of Device tag as Physical device tag if Device tag value is valid, otherwise, device is considered as invalid device |
| 4 | Device ID | | A unique number that is used to identify the device. | String | Max 32 Characters. Only contains character in ~ -!@#$%^&*()_+={}[]\|:;"'<>,.?/ a-z,A-Z,0-9 | Show empty value |
| 5 | Device path | Y | The paths of the devices that are connected to the Field Communications Server. | String | Max 32 Characters. A guide may be enclosed to for more details about the format of device path. | If Device path is invalid, consider device as invalid device |
| 6 | IO&I type | | The Input/ Output module card model | String | Only contains character in ~ -!@#$%^&*()_+={}[]\|:;"'<>,.?/ a-z,A-Z,0-9 | Show empty value |
| 7 | Communication type | Y | The protocol type of the device. | String | The value must be in an acceptable format in accordance with the protocol type of the device (e.g. "FF-H1", "HART" or others) | Dropdown list may shows 2 items: FF-H1 or HART. Selected value is based on Device address value. If Device address is any hexadecimal value from 0 to C, FF-H1 is selected, otherwise, HART is selected. |

| No | Device Property | Mandatory? | Description | Data Type | Validation | Auto fix rule |
|---|---|---|---|---|---|---|
| | | | | | Mapping list file | |
| 1 | Device tag | ✓ | The device tag of the actual device that is associated with the function block. This tag must be the same as the device tag that you set in the device list. | string | Max 32 Characters. Only contain character in – ~!@#$%^&*()_+={}[]:";'<>?,./ 2D.a. 2D.A.2D. 0-9 | If Device tag is invalid, consider mapping as invalid. |
| 2 | System tag name | ✓ | The associated function block of a device. | string | Max 32 Characters. Only contain character in – ~!@#$%^&*()_+={}[]:";'<>?,./ 2D.a. 2D.A.2D. 0-9 | Show empty value |
| 3 | Terminal | | The terminal number of the device | string | Max 64 Characters. Only contain character in – ~!@#$%^&*()_+={}[]:";'<>?,./ 2D.a. 2D.A.2D. 0-9 | Show empty value |
| 4 | Connection type | ✓ | The connection parameter of the function block (e.g. IN, OUT) | string | Max 64 Characters. Only contain character in – ~!@#$%^&*()_+={}[]:";'<>?,./ 2D.a. 2D.A.2D. 0-9 | Dropdown list shows list of possible value for Connection type that device can have. Selected value is empty |
| 5 | Block type | | The function block type | string | Max 64 Characters. Only contain character in – ~!@#$%^&*()_+={}[]:";'<>?,./ 2D.a. 2D.A.2D. 0-9 | Dropdown list shows list of possible value for Block type that device can have. Selected value is empty |

Fig. 5B

Mapping list file

| No | Device Property | Manda tory? | Description | Data Type | Validation | Auto fix rule |
|---|---|---|---|---|---|---|
| 6 | Station | | The domain and station number of the function block | string | Max 64 Characters<br>Only contain character in: ~!@#$%^&*()_+={}[]:"\|;'<>,.?/a-zA-Z0-9 | Show empty value |
| 7 | Engineering unit | | Unit used by the function block | string | Max 64 Characters<br>Only contain character in: ~!@#$%^&*()_+={}[]:"\|;'<>,.?/a-zA-Z0-9 | Show empty value |
| 8 | Upper limit | | Upper limit assigned in the function block | numeric | -100000000 - 100000000<br>Max 16 characters | Show empty value |
| 9 | Lower limit | | Lower limit assigned in the function block | numeric | -100000000 - 100000000<br>Max 16 characters | Show empty value |
| 10 | Input signal conversion | | The input signal conversion in function block | string | Value should only be: Linear or Square Root or Others | Dropdown list shows 3 items: Linear or Square Root or Others<br>Selected value is Linear |
| 11 | Control action | | Direct / Reverse | string | Value should only be: Direct or Reverse | Dropdown list shows 2 items: Direct or Reverse.<br>Selected value is Direct. |

DEVICE MANAGEMENT SYSTEM AND METHOD FOR COMMISSIONING FIELD DEVICES WITH ERROR RESOLUTION

FIELD OF THE INVENTION

The present invention relates to a device management system and method. In particular, the device management system and method are suitable (but not limited) for performing validation prior to commissioning at least one field device and will be described in such context.

DISCUSSION OF THE BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Field devices are instruments or transmitters that are used to obtain process variables in an equipment or part of an industrial process in an industrial facility or plant. Some field devices are used as measurement meters to obtain specific process variables. For example, a field device can be used as a temperature transmitter for temperature process variable, a flow meter for flow rate process variable, and a pressure transmitter for pressure process variable.

Most known field devices are configured to function according to one of the standard communication protocols, such as HART, or Foundation Fieldbus. A field device which uses HART communication protocol will be hereinafter be referred to as a HART field device, one using Foundation Fieldbus is FF-H1 field device.

Before deployment, field devices have to be commissioned. Commissioning is a process for testing if the field devices, equipment, facility or industrial plant will perform one or more specified functions according to design objectives or specifications. The commissioning is typically done by performing a manual work check function, which is tedious, time consuming and prone to human errors. These errors include incorrect procedures such as the inadvertent skipping of certain steps to be carried out or a deviation from the proper sequence in testing, both which result in errors or inaccurate test results.

To mitigate the above problems associated with manual commissioning, the Applicant had developed a commissioning tool. The commissioning tool is a device management system with an integrated commissioning tool aimed towards reducing commissioning time, cost and improving commissioning quality. For each type of field device and related functions, the commissioning tool is operable to pre-program the various testing steps and sequences, automate certain steps and ensure that the testing sequences are properly adhered to. To this end, an important function of the commissioning tool is an import device operation that allows user to import source files relating to the field device into the commissioning tool. Once a source file is imported, the commissioning tool may then, where necessary, convert the source file into a device list file and a mapping list file for the use of commissioning.

An example of the import device operation, from a user's perspective is as follows:

i. Users select one or more source files to import;
ii. Users initiate the import device operation by clicking on a button (e.g. a "Next" button) on a graphical user interface provided. Once the command is received by the commissioning tool, the system loads an "Importing devices progress" page to be shown to inform users that the commissioning tool is validating the source files.
iii. After validation, a "Summary" interface page may be displayed comprising
   a. valid device information;
   b. invalid device information; and
   c. conflict between new and existing information.
   The content of this summary page depends on whether all information in the source files is valid and whether conflicts exist between the new data and existing data. It is to be appreciated that all invalid devices are removed and only valid devices will be processed after this step.
iv. If there exist conflicts between new and existing information, and users want to resolve the conflict, a Conflict Resolution user interface is shown to allow users to resolve the conflict. Users can also reset task related to conflict device if needed.
v. An "Import Devices results" user interface page is shown if the user does not cancel the Import Devices operation and there is no "Import Devices failed" page is shown.

If errors are found within the source files, the errors are sent to one or more error detail files. The error detail provides information about the field device having error and the name of source file that contains the error devices so that users can have information to fix errors in these files. Simultaneously, the import device operation is aborted.

Therefore, with the existing system, if users wish to import devices that have errors, they have to manually modify or resolve the error within the source file before repeating the import device operation. Such modification or resolution is typically time consuming and tedious. In the manual modification or resolution process, users often have to rely on trial and error or certain amount of guesswork to arrive at a suitable correction to resolve the error.

In addition, as the import process is aborted whenever an error is detected, easily rectifiable errors typically generated due to typographical error or omission of certain entries in the source file will inadvertently trigger an 'import abort' which require the import device operation to be repeated. This unnecessarily adds on to the overall time taken for importation, reduces efficiency and increases frustration on the part of the users.

It is therefore an object of the invention to meet the above needs and alleviate the challenges at least in part.

SUMMARY OF THE INVENTION

In accordance with a first aspect of the invention there is a device management system for performing validation prior to commissioning at least one field device comprising a commissioning tool operable to receive at least one source file relating to the at least one field device for import operation; a processor operable to check the source file for any error; wherein if at least one error is found in the source file; the processor is operable to refer to an error resolution database for providing guidance on resolution of error associated with the source file without terminating the import operation.

Preferably the processor is operable to convert the at least one source file to a device list file. Preferably, the source file may be further converted to a device list file and a mapping list file.

Preferably the error resolution database comprises a device error resolution database and a mapping error database. The error resolution database may be utilized for providing guidance on resolution of error associated with the device list file and the mapping error resolution database may be utilized for providing guidance on resolution of error associated with the mapping list file.

Preferably the commissioning tool is operable to provide an error handling interface for displaying the at least one error and the guidance is a suggested correction for the at least one error.

Preferably the commissioning tool is in data communication with a control system, the control system interfacing with the at least one field device.

Preferably the commissioning tool is in data communication with a repository for purpose of generation, supplementation and update of the error resolution database.

Preferably the repository comprises at least one field device information file, a registration file, a protocol device registration file and a control system loop information file.

Preferably the device error resolution database or the mapping error resolution database is stored as .xml file format.

Preferably the suggested correction is updatable at any time the error handling interface is provided.

Preferably a summary of status is provided after validation.

Preferably if the at least one error is associated with a parameter which is non-mandatory, the suggested correction is in the form of an empty entry.

Preferably if the at least one error is associated with a parameter which is mandatory, the suggested correction is based on a modification of the parameter which is mandatory to comply with a validation rule.

Preferably if the at least one error is associated with a parameter related to the path or address of the at least one field device, then the suggested correction is in the form of an input for the entry of a correct path or address of the at least one field device.

In accordance with a second aspect of the invention there is a method for performing validation prior to commissioning at least one field device comprising the steps of receiving at least one source file relating to the at least one field device for import operation; and checking the source file for any error; wherein if at least one error is found in the source file; providing guidance on resolution of error associated with the device list file without terminating the import operation.

Preferably the method further comprises a step of converting a portion of the source file to a device list file. Preferably, the conversion may be to a device list file and a mapping list file.

Preferably an error handling interface for displaying the at least one error is provided and the guidance is in the form of a suggested correction for the at least one error.

Preferably the suggested correction is updatable at any time the error handling interface is provided.

Preferably the at least one error is associated with a parameter which is non-mandatory, the suggested correction is in the form of an empty entry.

Preferably if the at least one error is associated with a parameter which is mandatory, the suggested correction is based on a modification of the parameter which is mandatory to comply with a validation rule.

Preferably if the at least one error is associated with a parameter related to the path or address of the at least one field device, then the suggested correction is in the form of an input for the entry of a correct path or address of the at least one field device.

In accordance with a third aspect of the invention there is a non-transitory computer readable medium containing executable software instructions thereon wherein when executed performs the method of performing validation prior to commissioning at least one field device comprising the steps of receiving at least one source file relating to at least one field device for import operation; and checking the source file for any error; wherein if at least one error is found in the source file; providing guidance on resolution of error associated with the device list file without terminating the import operation.

BRIEF DETAILS OF THE DRAWINGS

In order that this invention may be more readily understood and put into practical effect, reference will now be made to the accompanying drawings, which illustrate preferred embodiments of the invention by way of example only, wherein:

FIG. 4A and FIG. 4B are example tables illustrating the rule bases for handling errors in the device list file;

FIG. 5A and FIG. 5B are example tables illustrating the rule bases for handling errors in the mapping list file.

Other arrangements of the invention are possible and, consequently, the accompanying drawings are not to be understood as superseding the generality of the description of the invention.

DESCRIPTION OF EMBODIMENTS OF THE INVENTION

In the description, the term 'source file' includes, but is not limited to, input/output list files, device list files, and engineering files (with device list file or I/O list file, if necessary). It is to be appreciated that the engineering files are suitable to be used for configuration of a plant asset management system or a plant control system. The plant asset management system or plant control system may be used for monitoring and/or control of an industrial plant. The various files (source, device, I/O, engineering) may comprise electronic data containing information relating to specific parameters of the field devices, the asset management system, and/or the plant control system.

Throughout the description, the term 'device list file' include parameters or properties associated with field devices such as (but not limited to) 'system', 'device tag', 'device path', 'communication type', 'device address', and 'input output type' etc. The term 'mapping list file' will include parameters or properties associated with field devices such as (but not limited to) 'device tag', 'system tag name', 'connection type', etc.

In accordance with an embodiment of the invention there is a device management system 100 for performing validation prior to commissioning at least one field device. The device management system 100 is suited, but not limited to facilitate the commissioning process of field devices in the context of a field device management system as shown in FIG. 1.

Figure 1A:
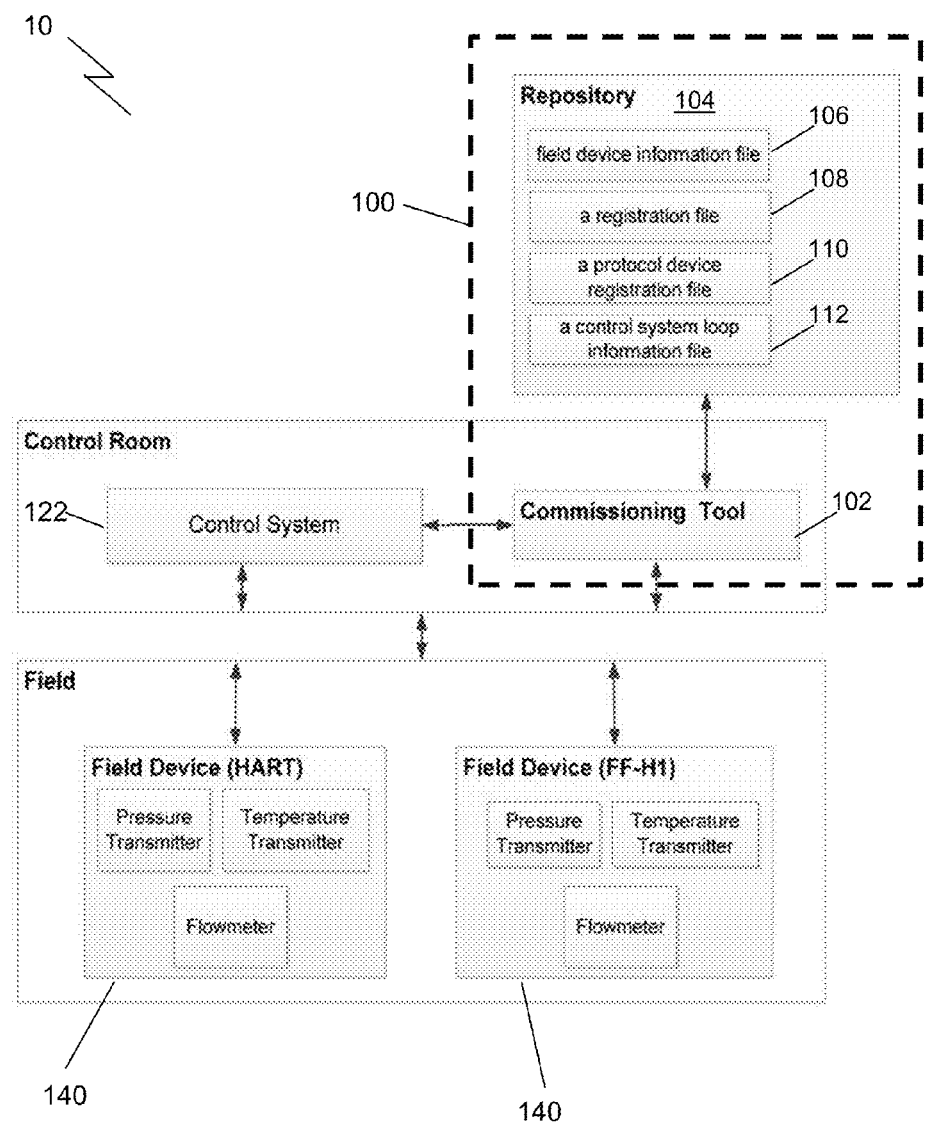
FIG. 1A, FIG. 1B and FIG. 1C are system block diagrams of field device management systems in accordance with various embodiments of the invention.

With reference to FIG. 1, a system block diagram of a field device management system 10 is shown. The field device management system comprises a control system 122 in data communication with at least one field devices 140. The control system 122 is operable to be in data communication with the device management system 100.

The device management system 100 comprises a commissioning tool 102 and a repository 104. The commissioning tool 102 is arranged and configured to communicate with the at least one field devices 140, the repository 104 and with the control system 122. The commissioning tool 102 is configured to refer files stored in the repository 104 for purpose of performing automatic commissioning processes and procedures for the at least one field device 140. Commissioning tool 102 can be implemented by software in combination with hardware, and may be complemented by servers and processors to implement the functions as known to a skilled person.

The repository 104 is configured to have a field device information file 106, a registration file 108, a protocol device registration file 110, a control system loop information file 112 and any other temporary or permanent files, if any. In another embodiment, the repository 104 includes list files associating each field device with certain property(ies). Example of such list file includes a "vendor list file" retrievable by the commissioning tool 102 during operation.

The field device information file 106 comprises a list of field devices which are configured to be in communication with the field device commissioning system, and describes one or more properties for each field device. Examples of such property include "device tag", "device model", "device ID", "manufacturer/vendor ID" and "revision Number". The field device information file 106 can be referred by the commissioning tool 102 to allow the commissioning tool 102 to perform a task to identify a type of the field device. As an example, identification of the field device 140 may include checks on whether the field device 140 is a pressure transmitter, a temperature transmitter or a flow meter.

The registration file 108 lists, for each field device, device communication commands which are to be executed to the respective field device 140 for a desired task or check function. The registration file 108 can be referred by the commissioning tool 102 to allow the commissioning tool 102 to identify a specific type of device communication command, such as a "HART Command 54", and then to execute it to a field device 140 which is a HART field device. The protocol device registration file 110 lists field devices 140 which are registered in a respective protocol database. For example, a HART field device may be registered with HART communication foundation. A HART field device registration file is created from HART field devices which are registered with the HART communication foundation. For Foundation Fieldbus H1 ("FF-H1") field devices which are registered in the Fieldbus foundation, a corresponding FF-H1 registration file is created. The protocol device registration file 110 can be implemented as separate files, one for each communication protocol.

Alternatively, the protocol device registration file 110 can be implemented as one file including field devices registered in all protocols with a suitable identifier to distinguish the respective protocols for the respective field devices. In some cases, the protocol device registration file 110 may include specific field devices such as field devices which are pressure transmitters.

The control system loop information file 112 comprises, for each field device, a list of the respective or associated configuration parameters in the control system 122. If the control system 122 comprises function blocks, the function blocks information and association of function with the field devices 140 are included in the control system loop information file 112. The association or 'map' between the function blocks with the field devices 140 is included as a mapping table. The control system loop information file 112 is updated to the repository 104 when required, such as for each change in any field device or configuration parameters in the control system 122. The update is done by importing the control system loop information file 112 as the need arises.

The at least one field device 140 may include a field device based on HART communication protocol and/or a field device based on FF-H1 communication protocol. The HART and/or FF-H1 field device may perform specific functions such as a pressure transmitter, temperature transmitter or flow meter.

Figure 1B:
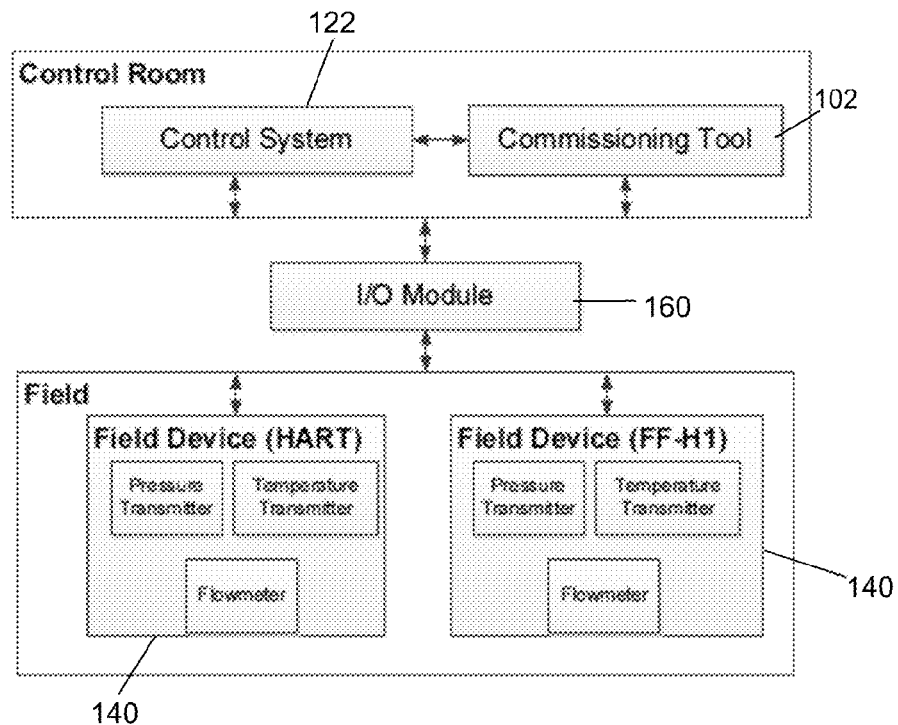
Figure 1C:
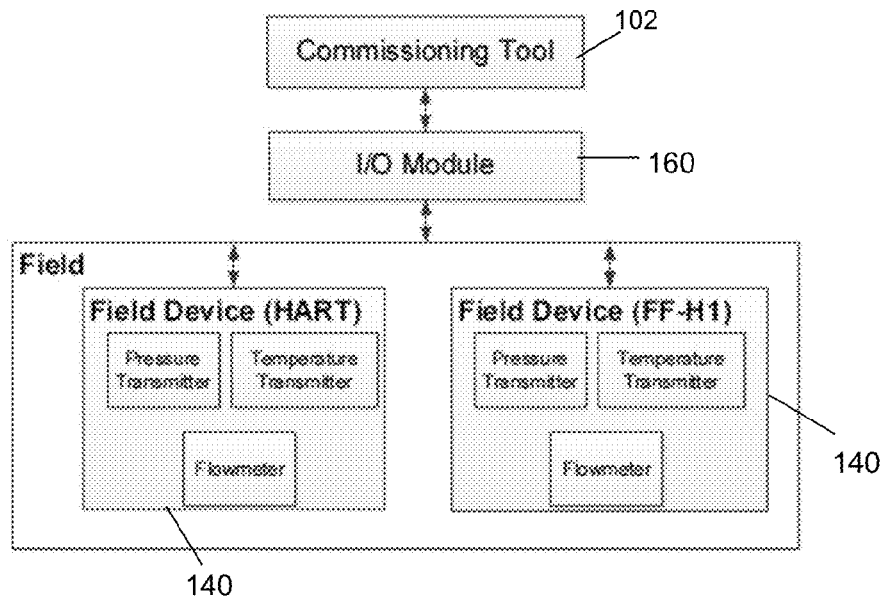

In other embodiments shown in FIG. 1B and FIG. 1C, the commissioning tool 102 may be in direct or indirect data communications with:

i. servers and processors to implement at least one of control system 122; and ii. Input-output (I/O) module 160 providing a necessary interface to communicate with the field devices. In particular, the Input-output (I/O) module comprises a device which is operable to receive and transmit various types of electrical and electronic signals to control and monitor field devices in a network including field devices and at least a control system, a device management system and a commissioning tool.

The control system 122 may be in direct data communication with the field devices 140 according to some embodiments of the invention. The commissioning tool 102 or the control system 122 is in direct data communication with the I/O module 160 when it is in indirect data communication with the field devices according to some embodiments of the invention.

In another embodiment, the control system 122 may not be necessary or may be integrated with the commissioning tool 102 for direct or indirect communication with the field devices 140 via the I/O module 160.

The commissioning tool 102 in normal operation, as part of the import device operation is operable to receive source files for import.

In an embodiment, commissioning tool 102 incorporates an error handling function comprising an "auto fix" function that allows a user, such as an engineer, the opportunity to modify or correct any errors/incorrect information regarding a field device during the import device operation directly so as to avoid abortion and the need to repeat the import device operation from start whenever an error is discovered. Advantageously, guidance may be provided to the user to aid the user in correction or rectification of any error(s) discovered during the import device operation. An example of the guidance provided may be in the form of a suggested solution or recommended solution presented to the user for acceptance. Such suggested solutions are particularly useful for inexperienced user(s).

Figure 2:
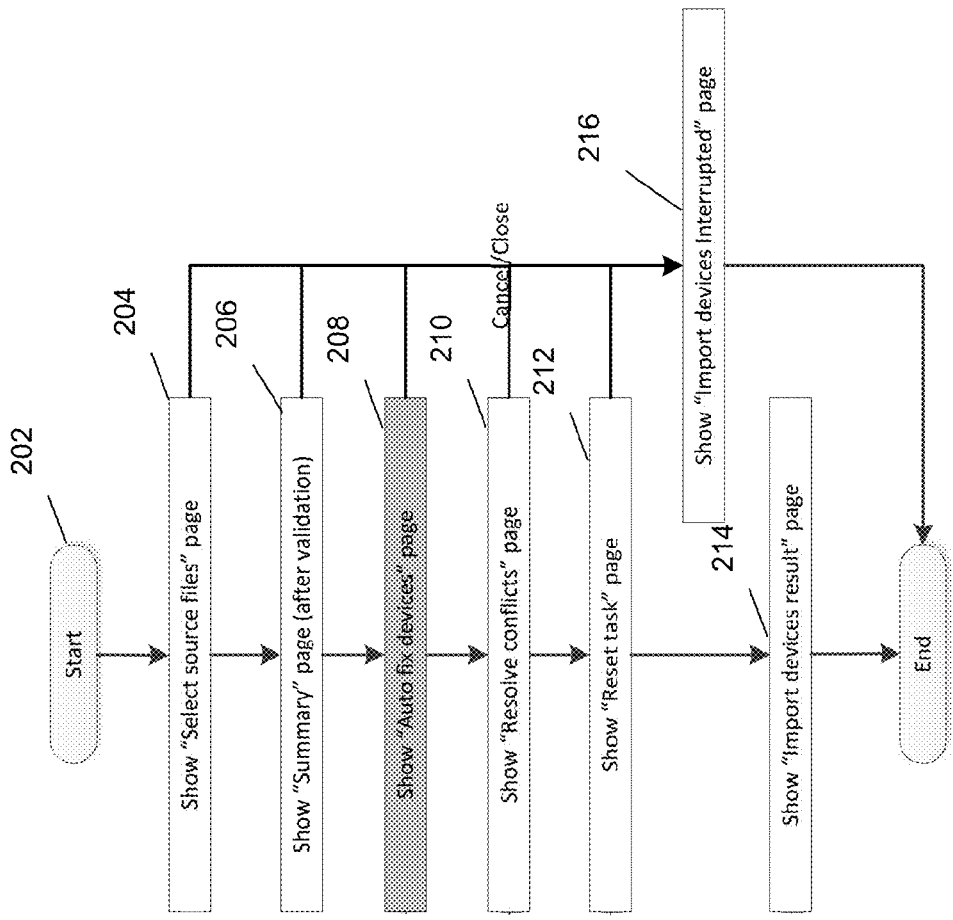
FIG. 2 is a flow chart showing the incorporation of an error handling ("Auto fix") feature in the import device operation in accordance with an embodiment of the invention.

Referring to FIG. 2, an import device flow chart incorporating the error handling function is shown. The import device flow chart may be implemented in the form of software having a user graphical interface 300. The user graphical interface 300 comprises an interface for error handling and may also be referred to as an error handling interface 300. The flow chart commences with a start step 202 awaiting input from a user to import files. The input may be in the form of a drop down menu or a click button as known to a skilled person. When the user input is received, the commissioning tool 102 shows an interface, preferably in the form of an electronic form for the user to select the source file (step 204). The selection may be in the form of a 'path' or an URL link to the source file location within a computer or dedicated server functioning as a repository. The computer and the repository may be in a network or spread across distributed networks according to some embodiments of the invention.

Upon receiving the source file, the commissioning tool 102 validates the entries within the source file and check for errors (step 206). If any error is detected, the error handling user interface 300 would be provided for the user to have an opportunity to rectify the error (step 208); instead of terminating the process as described in the background section.

Figure 3:
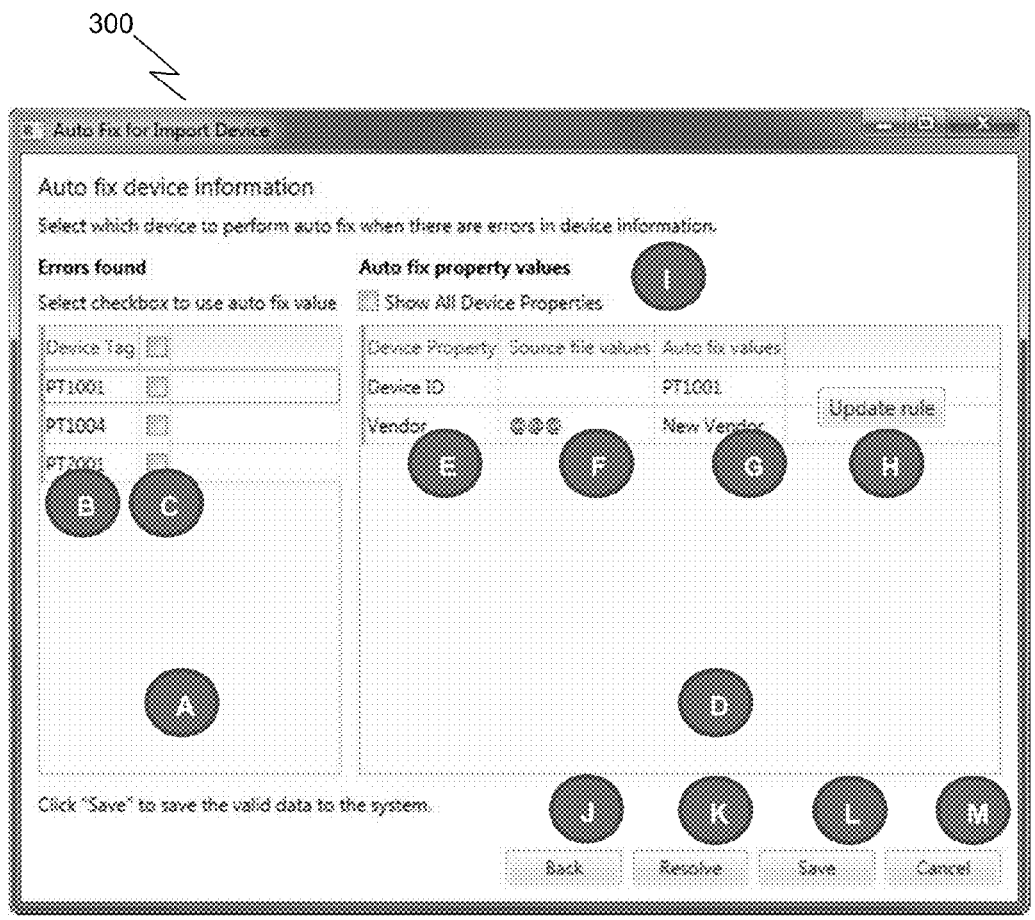
FIG. 3 shows an example user interface of the error handling ("auto fix") feature in accordance with an embodiment of the invention.

In an embodiment, an example of the error handling user interface 300 is shown in FIG. 3. The error handling interface 300 includes various items. An example list of items which are used to configure the error handling interface 300 is shown in Table 1. The example items in the Table 1 under column header "Item" are illustrated by same alphabets in FIG. 3.

In table 1, column "Control" refers to a location or a visual representation for the item on the error handling interface 300. The location or a visual representation is configured to enable at least one of a display function or a control function for the item. Examples of the location or visual representation may include "Button", "Label", and "Checkbox" etc.

The column "Default" refers to a default display or control value. For example, a checkbox is "Uncheck" by default when the checkbox is configured to be included in the interface for item C and item I.

The column "Constraints" describes a limitation such as access rights and restrictions for the item (if any).

TABLE 1

User interface for error handling (auto-fix with reference to FIG. 3)

| Item | Item Name | Description | Control | Default | Constraints |
|---|---|---|---|---|---|
| A | Errors found | Contain list of devices that have errors in source file | Data grid | N/A | none |
| B | Device Tag | Device Tag of field devices that comprise error(s). | Data grid column | N/A | Read only |
| C | Check Box | If engineers want to import devices that have errors and replace the error with auto fix value, they need to check this check box, otherwise, the device will not be imported into the commissioning tool | Data grid check box column | Uncheck | If engineers want to check all devices, they can check the "check all box" in the column header |
| D | Auto fix property values | Contain list of property values and auto fix values for these properties | Data grid | N/A | none |
| E | Device Property | Contain all properties of device that have invalid value (e.g. Device ID, Vendor etc.) | Data grid column | N/A | Read only |
| F | Source file values | Original value of device property in source file | Data grid column | N/A | Read only |
| G | Auto fix values | Value that the commissioning tool suggests to users using this value to fix the errors. Based on a predefined rule base. | Data grid textbox column | N/A | Users can easily edit the value if they don't want to use the default value that commissioning tool provides |
| H | Update rule | When this button is clicked, it will update the auto fix rule with the suggested value that users provide in the Auto fix value column. "Update rule" button is available for some properties that allow users to update auto fix rule. | Data grid button column | N/A | none |

TABLE 1-continued

User interface for error handling (auto-fix with reference to FIG. 3)

| Item | Item Name | Description | Control | Default | Constraints |
|---|---|---|---|---|---|
| I | Show All Device Properties | When uncheck this checkbox, only device properties that have errors will be shown. When check this checkbox, all the device properties will be shown | Checkbox | Uncheck | none |
| J | Back | Move to the previous page, in this case, the Summary page data previously provided by the user in the previous page remains available | Button | N/A | None |
| K | Resolve | Allow engineers to resolve any conflicts in the Conflict Resolution page that follows Move to the Conflict Resolution page | Button | N/A | Only shown if there are conflicts to resolve |
| L | Save | Save the devices and mappings from the source files to the system Skip the Conflict Resolution page (if applicable), meaning it will go directly to the Results page, and use the existing values in the system if there are any conflicts Move to the Import Devices results page | Button | N/A | none |
| M | Cancel | Cancel the Import Devices operation; no changes are made to the system Move to the Import Devices interrupted page | Button | N/A | none |

The error handling interface 300 therefore provides an opportunity for a user to:

a. fix an error without resetting the import operation process if the user wishes to continue import a particular field device that has an error (see item C);

b. for each error, provide at least one suggested solution where applicable, and hence some form of guidance, on how to resolve the error (see item G);

c. provides the flexibility for a user to update one or more suggested solutions to resolve the errors (see item H).

Figure 4B:
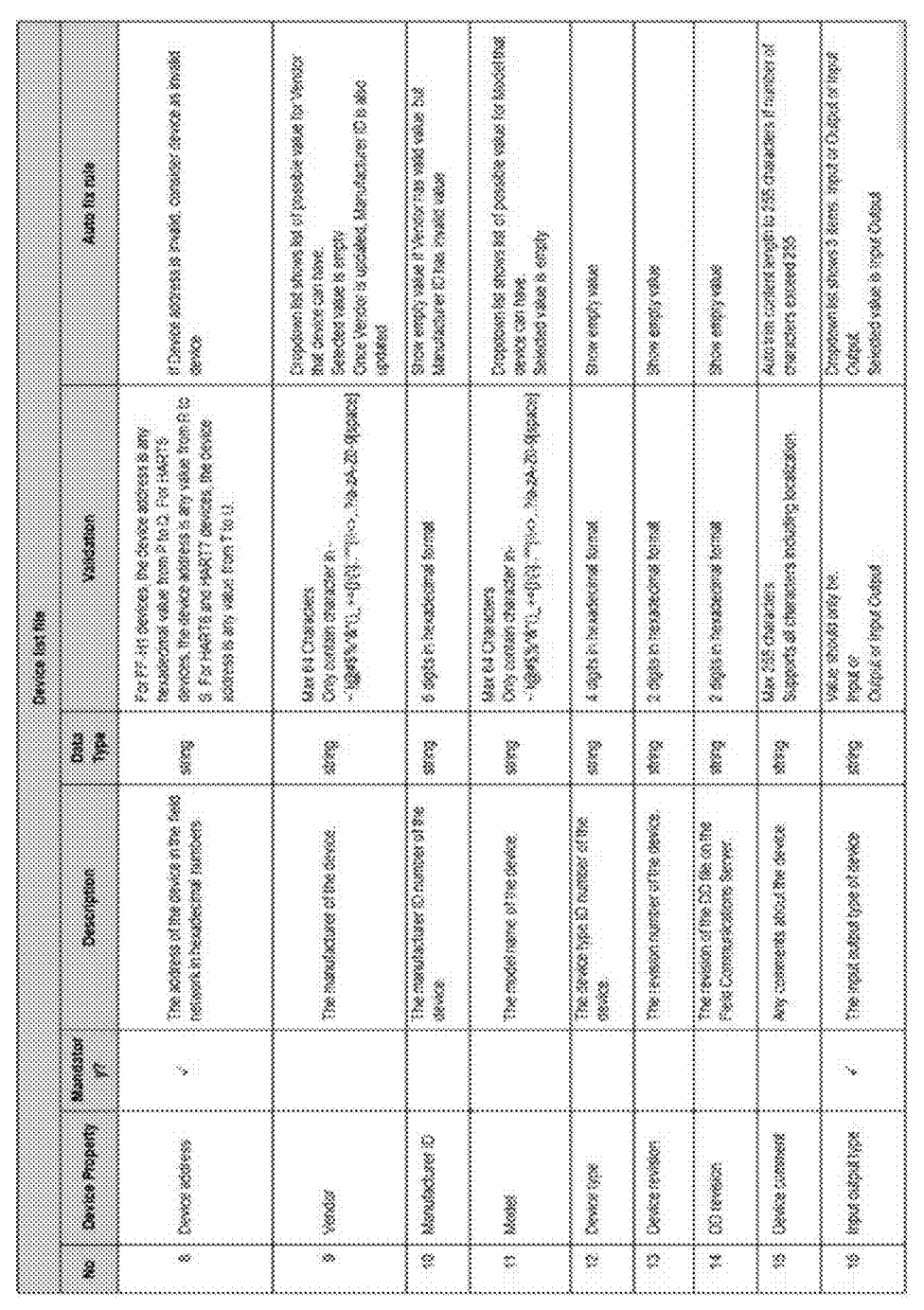

The predefined or predetermined rule base or error resolution databases mentioned in item G of Table 1 is detailed in FIG. 4 and FIG. 5. FIGS. 4a and 4b refer to the rule base comprising a device error resolution database with suggested solutions for various errors related to a device list file. FIGS. 5a and 5b refer to the rule base comprising a mapping error resolution database with suggested solutions for various errors related to a mapping list file.

It is to be appreciated that the rule bases in either FIG. 4 or FIG. 5 may be updatable by an authorized user such as a developer. The values associated with the parameters to be updated by an authorized user may be done manually or automatically. In an embodiment, values are updated automatically to the rule base when the values are input by authorized user(s) for a first time. This will be further elaborated.

The rule base for resolving errors in the device list file and the mapping list file may be organized such that when an error in the device list file is detected, the commissioning tool 102 checks through the rule base (which may be presented as a table format) to retrieve a suitable auto-fix solution/rule to be applied for error resolution. The table comprises the following six parameters categorized into six columns:—'device property', 'mandatory', 'description', 'data type', 'validation' and 'auto fix rule'. It is to be appreciated that more or less columns may be added or subtracted where necessary. For example, the 'description' column may be removed as it serves merely as an information source to facilitate ease of understanding and does not affect the operations of the error handling process. The six parameters are further described in turn.

'Device Property'—refers to device information, protocol and other information as may be referred from the files 106, 108, 110, 112 in the repository 104;

'Mandatory'—whether the error is caused an entry which is mandatory for the import operation. If not mandatory, a quick suggested solution is to leave the field blank as part of error resolution, i.e. 'Show empty value';

'Description'—information relating to the device property. To facilitate understanding for a user;

'Data type'—the data type for the device property which the commissioning tool 102 will accept, such as string, binary, numeric etc. A wrong data type for a device property will generate an error;

'Validation'—further restrictions on data type. For example, if a data type is string, further restrictions may be placed on maximum number of characters, specific string input, type of string input etc.

'Auto-fix rule'—the suggested solution when an error is detected. The suggested solution is generated to comply with the data type and validation parameters.

The workings of the rule base will be further illustrated in the context of the operation when a user imports a source file. From the table, a few scenarios will be described to illustrate the robustness of the auto fix function. It is to be appreciated that these scenarios are non-exhaustive.

Scenario A

Where there is an error in the device file relating to the parameter 'device tag', the commissioning tool 102 will retrieve the physical device tag and replace the erroneous device tag provided the physical device tag complies with the string data type, and is within 32 specified valid characters. Otherwise the device is considered as invalid. The device tag is a mandatory parameter and therefore it cannot be left blank. Where the parameter 'device tag' is invalid, the error handling interface 300 is shown with an empty value displayed as the suggested solution for a user to enter a valid parameter. If the user does not enter a valid parameter or if he/she enters another invalid parameter, then the device will not be imported. Referring to the item C check box of FIG. 3, the device will be unchecked and the import device will continue for other devices, where applicable.

Scenario B

In contrast, if the error relates to the parameter 'device ID', which is a non-mandatory parameter, then a suggested solution is to leave the parameter blank. Accordingly, the error handling interface 300 will be displayed for the user to accept the recommended solution or make changes complying with the data type and validation parameters.

Scenario C

There are instances where the error cannot be resolved as these are deemed 'fatal errors'. In such cases, the auto-fix page will not be displayed and the user will be requested to repeat the import device operation. These errors are related to the path and address of the field device, i.e. see 'Device path' which are paths connected to the field communications server, and 'Device address' which is the address of the device in the field network in hexadecimal numbers.

Scenario D

There are some parameters which are mandatory but the commissioning tool does not have a suggested solution. In such cases, an empty value will be displayed as the suggested solution and the user prompted to enter a valid value (see for example 'System tag name' in FIG. 5).

Scenario E

In most cases, if an erroneous parameter is due to a string length exceeding a predetermined number of characters, for example 255 characters, then a sample solution that contains 255 characters for device will be suggested for the user's consideration.

It is to be appreciated that the device list file and mapping list file rule bases may be generated, supplemented and/or updated from various sources. In particular the auto fix rule device file may be generated, supplemented and/or updated from a field device vendor list and/or model list; and the auto fix rule mapping file may be generated, supplemented and/or updated from a connection type list and a block type list file.

Preferably, the auto fix rule base comprises one or more files in extensible markup language (.xml) format. For example, the 'validation' parameter and 'auto fix rule' parameter in FIG. 4 and FIG. 5 may be in the form of an .xml file for update by a developer/user when necessary. The 'auto fix rule' parameter may further be modified by a user overriding the suggestion solution in the error handling interface 300.

Figure 6:
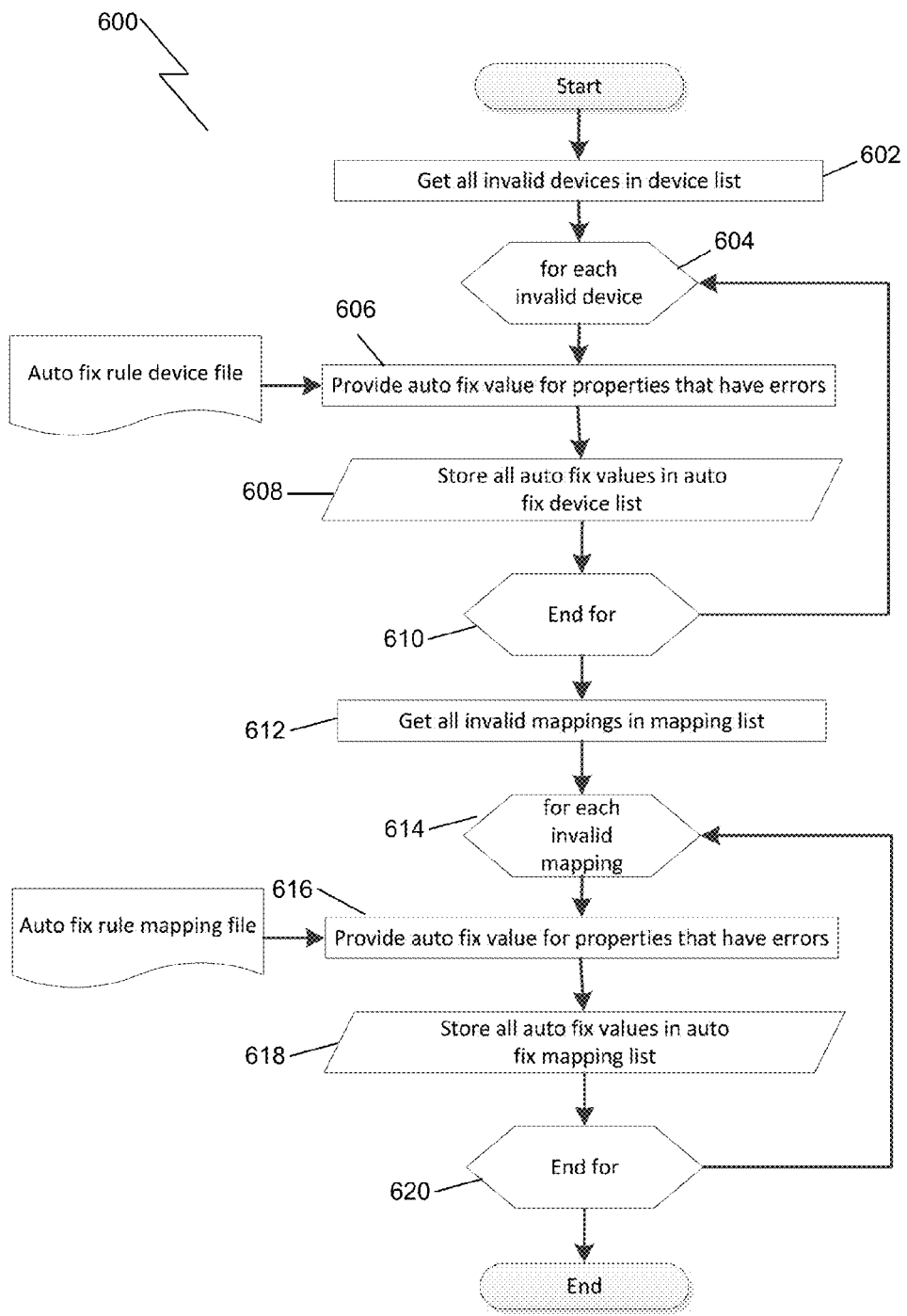
FIG. 6 is a flow chart showing how the device list file and mapping list file are processed once the error handling ("auto fix") feature is in operation.

The sequence of processing of source file to detect errors for subsequent auto fix is described with reference to FIG. 6. The process 600 commence with a consolidation of all invalid devices in the device list file (step 602). These invalid devices are deemed 'invalid' due to at least one error in the device list file derived from the source file during import operation.

The commissioning tool 102 then loops through each invalid device (step 604), and for each invalid device, the commissioning tool 102 refers to the rule base (see FIG. 4) to provide suggested solution to resolve the at least one errors.

Where there is no suggested solution, a blank or empty value may be shown, with the validation parameter and data type parameter to further guide the user to input a correct value (step 606). Any updated auto fix values in the auto fix device list file will next be stored (step 608) for reference by a developer, who may then make the decision whether to update the auto fix rule base for device based on any new input provided by the user.

Once all invalid devices have been processed, the auto fix operation for resolving errors of the device list file ends (step 610).

The process is repeated for the invalid mappings in the mapping list file, where it commences with a consolidation of all invalid mappings in the mapping list file (step 612). These invalid mappings are deemed 'invalid' due to at least one error in the mapping list file derived from the source file during import operation.

The commissioning tool 102 loops through each invalid mapping (step 614), and for each invalid mapping, the commissioning tool 102 refers to the rule base (see FIG. 5) to provide suggested solution to resolve the at least one errors. Where there is no suggested solution, a blank or empty value may be shown, with the validation parameter and data type parameter to further guide the user to input a correct value (step 616). Any updated auto fix values in the mapping fix device list file will next be stored (step 618) for reference by a developer, who may then make the decision whether to update the auto fix rule base for mapping based on any new input provided by the user.

Once all invalid mappings have been processed, the auto fix operation for resolving errors of the mapping list file ends (step 620).

It is to be appreciated that where no errors are detected or if there is a 'fatal error', the error handling interface 300 will not be shown.

Once the auto error fix step 208 is completed, the process continues with the display of a conflict resolution step 210 which is to be distinguished from the error fix step 208. Conflict resolution step 210 is required where there are duplicate entries in the import operation process which must be resolved.

In the event where a user wishes to reset the import device operation task due to duplicates, he will be able to do so via a reset task step 212. A 'results' interface will then be shown displaying the successful/unsuccessful status of the import device operation (step 214).

It is to be appreciated that at any one step 202 to 212, a user may cancel or abort the import device operation (step 216).

In accordance with another embodiment of the invention there comprises a method for performing validation prior to commissioning at least one field device 140 comprising the steps of receiving at least one source file relating to the at least one field device for import operation (step 204); converting a portion of the source file into a device list file; and checking the device list file for any error; wherein if at least one error is found in the device list file; providing guidance on resolution of error associated with the device list file without the need to terminate the import device operation and repeating the import device operation due to an error. The method may include the steps 202 to 216 as shown in FIG. 2, and to facilitate ease of users' input, the method may include the generation and display of an auto error handling interface 300 as shown in FIG. 3. In addition to a device list file, where applicable and if function blocks within the control system 122 exist then a mapping list file may also be generated during the conversion of source file. The process and resolution of errors, including the reference to the rule bases for guidance provided to a user to resolve any error without the need to terminate or restart the import device operation is as described in the earlier embodiment and will not be further elaborated.

In accordance with another embodiment of the invention there comprises a non-transitory computer readable medium that stores a computer program to be executed by the commissioning tool 102 described in the earlier embodiment. In particular, the computer program incorporates the auto-fix function and associated rule bases such that when executed, causes the commissioning tool to display the error handling interface 300 when at least one error is found, without the need to terminate or restart the import device operation.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In particular:

- Although the invention was described in the context of a specific commissioning tool, it is to be appreciated that the invention may be applied to other device management systems and commissioning tools.
- The commissioning tool may be in data communications with servers and processors (whether remote or otherwise) where applicable to implement the error handling/resolution function.

It would be further appreciated that although the invention covers individual embodiments, it also includes combinations of the embodiments discussed. Therefore, features described in one embodiment not being mutually exclusive to a feature described in another embodiment may be combined to form yet further embodiments of the invention.

The invention claimed is:

1. A device management system for performing validation prior to commissioning at least one field device comprising:
   a commissioning tool configured to receive at least one source file relating to the at least one field device in an import operation; and
   a processor configured to check the at least one source file for any error,
   wherein the processor is further configured to provide guidance on resolution of at least one error found in the at least one source file using rules for error handling retrieved from an error resolution database without terminating the import operation, the rules defining at least one auto fix option based on a device property and validation criteria associated with the at least one error.

2. The device management system of claim 1, wherein the processor is further configured to convert the at least one source file to a device list file.

3. The device management system of claim 2, wherein the processor is further configured to convert the at least one source file to a device list file and a mapping list file.

4. The device management system of claim 1, wherein the error resolution database comprises a device error resolution database and a mapping error resolution database.

5. The device management system of claim 1, wherein the commissioning tool is further configured to provide an error handling interface for displaying the at least one error and the guidance is a suggested correction for the at least one error.

6. The device management system of claim 1, wherein the commissioning tool is in data communication with a control system, the control system interfacing with the at least one field device.

7. The device management system of claim 1, wherein the commissioning tool is in data communication with a repository for purpose of generation, supplementation and update of the error resolution database.

8. The device management system of claim 7, wherein the repository comprises at least one field device information file, a registration file, a protocol device registration file and a control system loop information file.

9. The device management system of claim 4, wherein the device error resolution database or the mapping error resolution database are stored as .xml file format.

10. The device management system of claim 5, wherein the suggested correction is updatable at any time the error handling interface is provided.

11. The device management system of claim 5, wherein if the at least one error is associated with a parameter which is non-mandatory, the suggested correction is in the form of an empty entry.

12. The device management system of claim 5, wherein if the at least one error is associated with a parameter which is mandatory, the suggested correction is based on a modification of the parameter which is mandatory to comply with a validation rule.

13. The device management system of claim 4, wherein if the at least one error is associated with a parameter related to the path or address of the at least one field device, then the suggested correction is in the form of an input for the entry of the correct path or address of the at least one field device.

14. A method for performing validation prior to commissioning at least one field device comprising the steps of:
   receiving at least one source file relating to the at least one field device in an import operation; and
   checking the at least one source file for any error and providing guidance on resolution of at least one error found in the at least one source file using rules for error handling retrieved from an error resolution database without terminating the import operation, the rules defining at least one auto fix option based on a device property and validation criteria associated with the at least one error.

15. The method of claim 14, further comprising the step of converting a portion of the at least one source file to a device list file.

16. The method of claim 15, wherein the step of converting includes converting the at least one source file to a device list file and a mapping list file.

17. The method of claim 14, wherein an error handling interface for displaying the at least one error is provided and the guidance is in the form of a suggested correction for the at least one error.

18. The method of claim 17, wherein if the at least one error is associated with a parameter which is mandatory, the suggested correction is based on a modification of the parameter which is mandatory to comply with a validation rule.

19. The method of claim 17, wherein if the at least one error is associated with a parameter related to the path or address of the at least one field device then the suggested correction is in the form of an input for entry of the correct path or address of the at least one field device.

20. A non-transitory computer readable medium containing executable software instructions thereon wherein when executed performs the method of performing validation prior to commissioning at least one field device comprising the steps of:
  receiving at least one source file relating to the at least one field device in an import operation; and
  checking the at least one source file for any error and providing guidance on resolution of at least one error found in the at least one source file using rules for error handling retrieved from an error resolution database without terminating the import operation, the rules defining at least one auto fix option based on a device property and validation criteria associated with the at least one error.

* * * * *